Dec. 30, 1947.   F. T. SONNE   2,433,534
STEREOSCOPIC CAMERA
Filed April 14, 1944   6 Sheets—Sheet 1
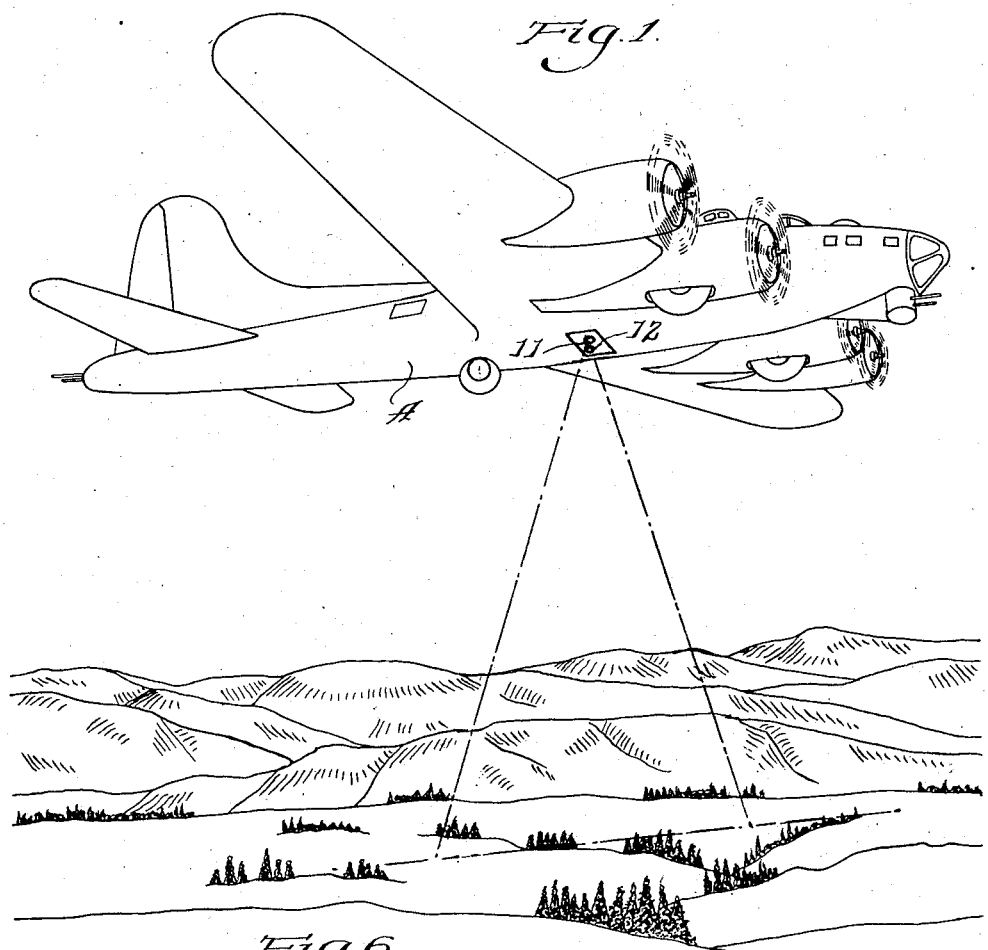
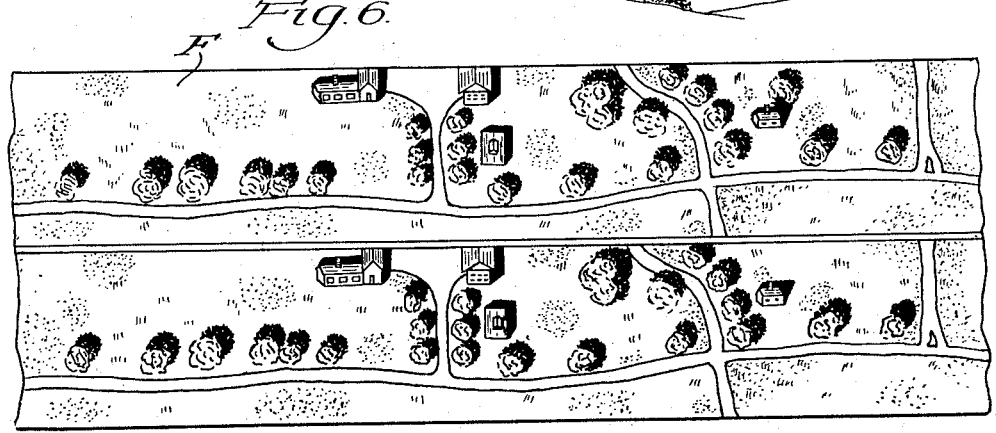
Inventor
Frederick T. Sonne
By: James A. J. Koehl
Attorney

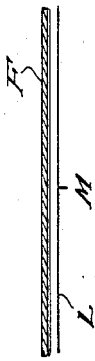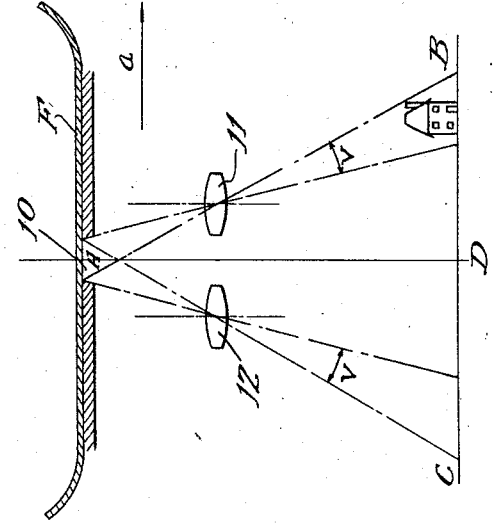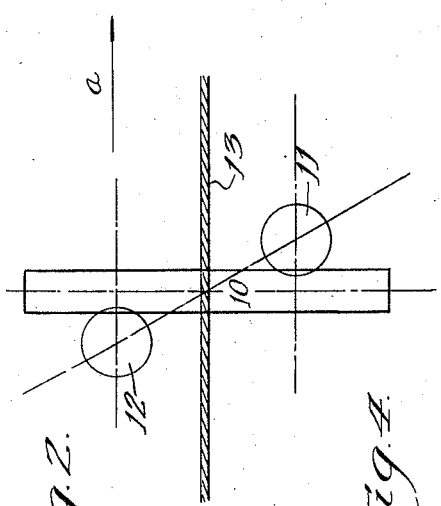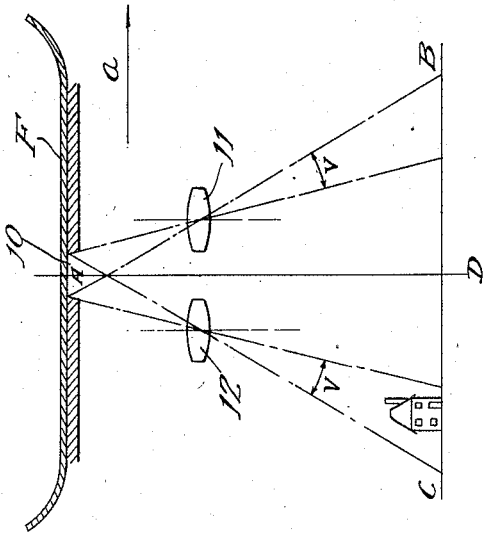

Dec. 30, 1947.       F. T. SONNE              2,433,534
                  STEREOSCOPIC CAMERA
           Filed April 14, 1944      6 Sheets-Sheet 3

Inventor:
Frederick T. Sonne
By: James A. G. Koehl
Attorney

Dec. 30, 1947.   F. T. SONNE   2,433,534
STEREOSCOPIC CAMERA
Filed April 14, 1944   6 Sheets-Sheet 4

Inventor:
Frederick T. Sonne
By James A. J. Koehl
Attorney

Dec. 30, 1947.   F. T. SONNE   2,433,534
STEREOSCOPIC CAMERA
Filed April 14, 1944   6 Sheets-Sheet 5

Inventor:
Frederick T. Sonne
By James A. J. Koehl
Attorney.

Dec. 30, 1947.　　　F. T. SONNE　　　2,433,534
STEREOSCOPIC CAMERA
Filed April 14, 1944　　　6 Sheets-Sheet 6

Inventor:
Frederick T. Sonne
By James A. J. Koehl
Attorney

Patented Dec. 30, 1947

2,433,534

UNITED STATES PATENT OFFICE 2,433,534

STEREOSCOPIC CAMERA

Frederick Theodore Sonne, Golf, Ill., assignor to Chicago Aerial Survey Company, Chicago, Ill., a corporation of Illinois Application April 14, 1944, Serial No. 531,062

5 Claims. (Cl. 95—18)

This invention relates to the art of photography and more particularly to apparatus for making photographs in any instance where there is relative motion between photographic objectives and the object, area or subject to be photographed.

As the invention is particularly adapted for making continuous aerial photographs, it is not amiss to say that, as distinguished from the well known system of making a continuous flat plan photograph of terrain upon a continuously moving light sensitive surface, the herein disclosed apparatus casts upon a light sensitive surface images of the infinite number of strips or portions of terrain over which the aircraft is flying and disposes said images on said surface so that the resulting photograph is characterized by left and right-hand pictures adapted when brought into coincidence in a viewer to give the effect of depth or relief to the subject, object or scene being viewed.

As a further distinguishing feature of my invention, the terrain is continuously photographed in different angular projection and during movement of the aircraft along its course, during which time, all images recorded at the same angle of projection, are arranged in unbroken continuity at one side of the longitudinal centerline of said light sensitive surface whereas the images viewed at a different angle of projection are arranged in unbroken continuity at the opposite side of said centerline, whereby the resulting photograph is further characterized by two continuous views of the terrain.

An object is to provide a camera, the optical system of which is such that during continuous motion of a light sensitive surface through the camera two photographs are made of the same object at slightly different times and in different angular projection to thereby provide in the resulting photograph a stereoscopic pair of pictures of said object.

A more specific object is the provision of an aerial camera for photographing the terrain in such manner that the resulting photograph is characterized by a plurality of similar continuous views of the terrain over which the aircraft was flown.

A further object is the provision of a camera which may be advantageously used when practicing the method of taking pictures and producing stereoscopic effects set forth in my copending application Ser. No. 558,210, filed October 11, 1944.

A further object is the provision of a shutterless camera in which normally inactive preset photographic mechanisms are adapted to be placed in operation at any instant a photograph is to be made and automatically to continue operating in a predetermined manner throughout the entire time the photograph is being made.

A still further object is the provision of a camera for the purpose described which is simple in its construction, strong, compact and of light weight and otherwise of a form capable of withstanding the effect of shocks and vibrations to which it necessarily must be subjected when used upon aircraft or any other vehicle from which a photograph is being made.

Other objects of the invention will be apparent to persons skilled in the art by the disclosure which follows.

Reference is now made to the accompanying drawings wherein similar reference characters designate similar elements and wherein:

Figure 1 is a view in perspective of an airplane equipped with the camera;

Figure 2 is a diagrammatic plan view of certain elements of the camera;

Figure 3 is a diagrammatic view showing an object in the field of view of one lens of the camera, the direction of flight being indicated by the arrow a.

Figure 4 is a view similar to Figure 3 showing the same object in the field of view of the other lens of the camera following a lapse of time, the direction of flight being the same as in Figure 3;

Figure 5 is a diagrammatic view of the exposure aperture;

Figure 6 is a plan view of a portion of a photograph made with the camera;

Figure 7:
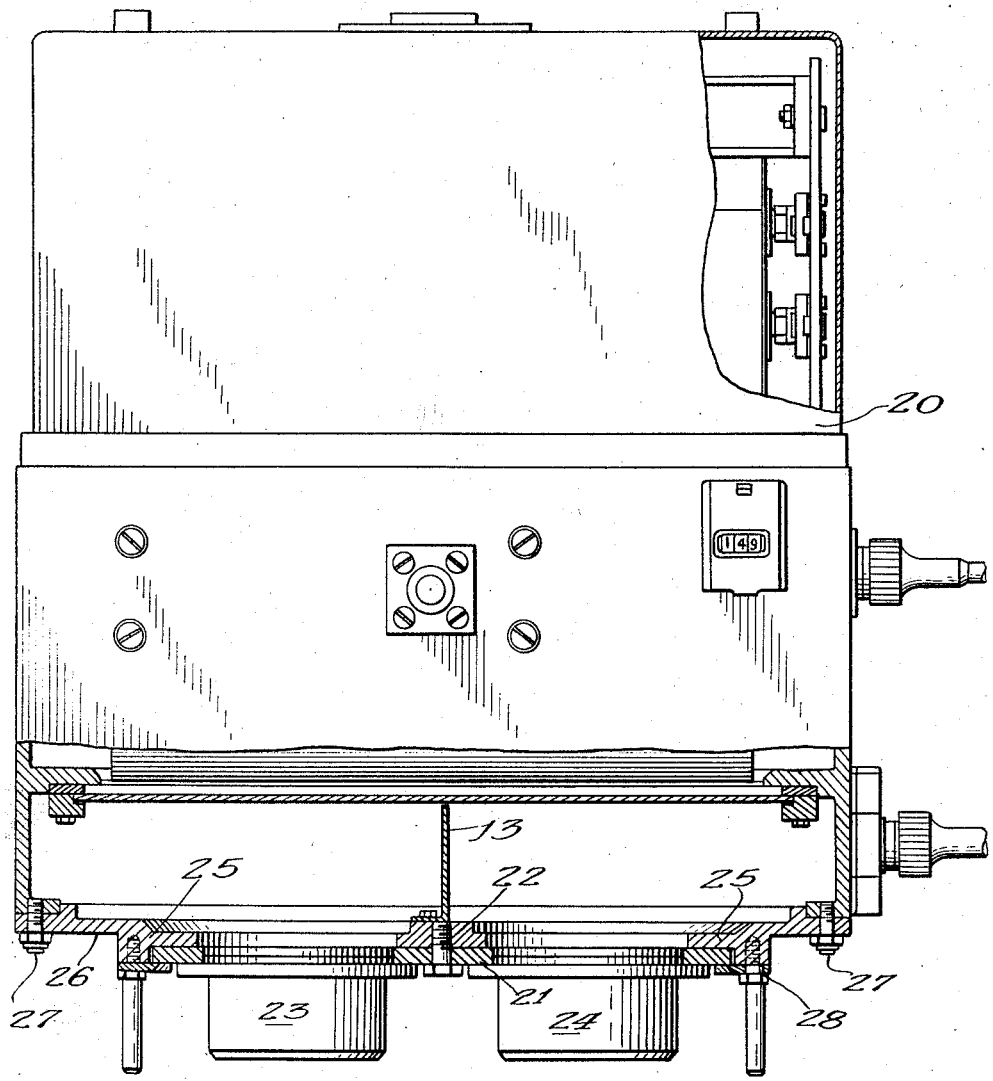
Figure 7 is a view in front elevation of the camera, parts being broken away and parts shown in section.
Figure 8:
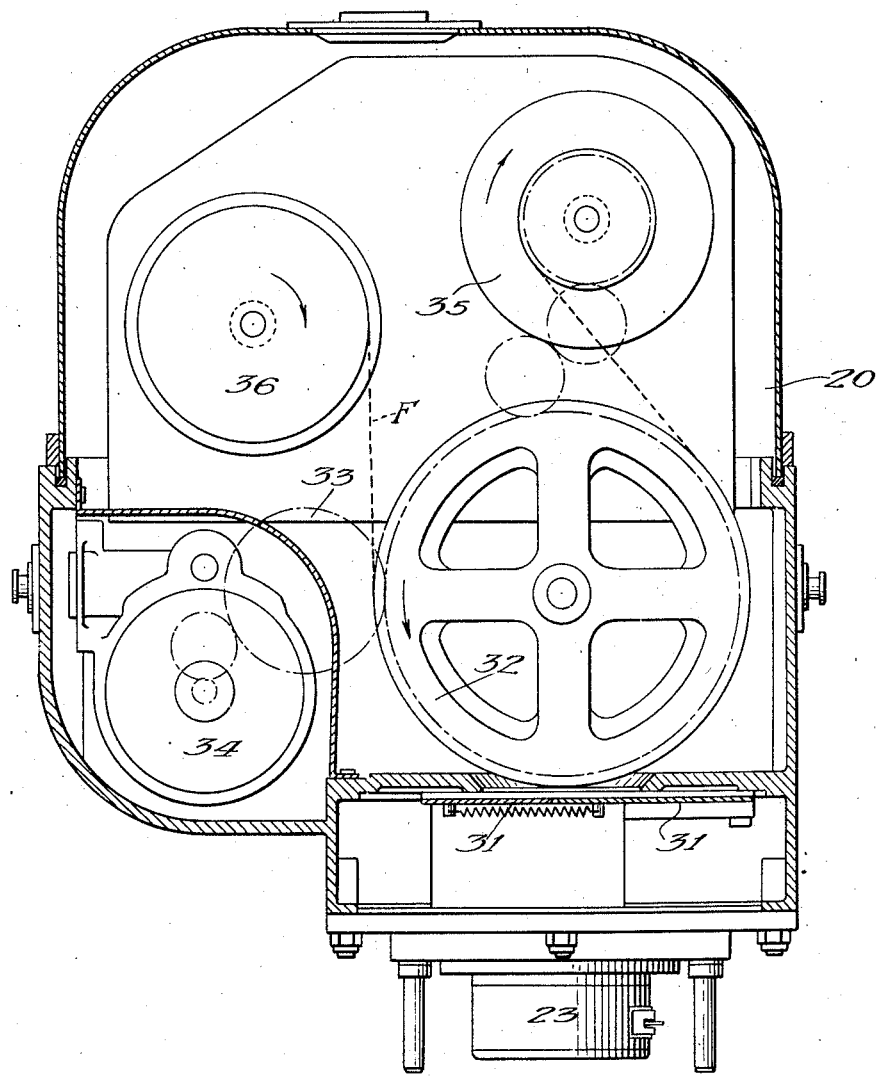
Figure 8 is a vertical section taken substantially on line 7—7 of Figure 6.
Figure 9:
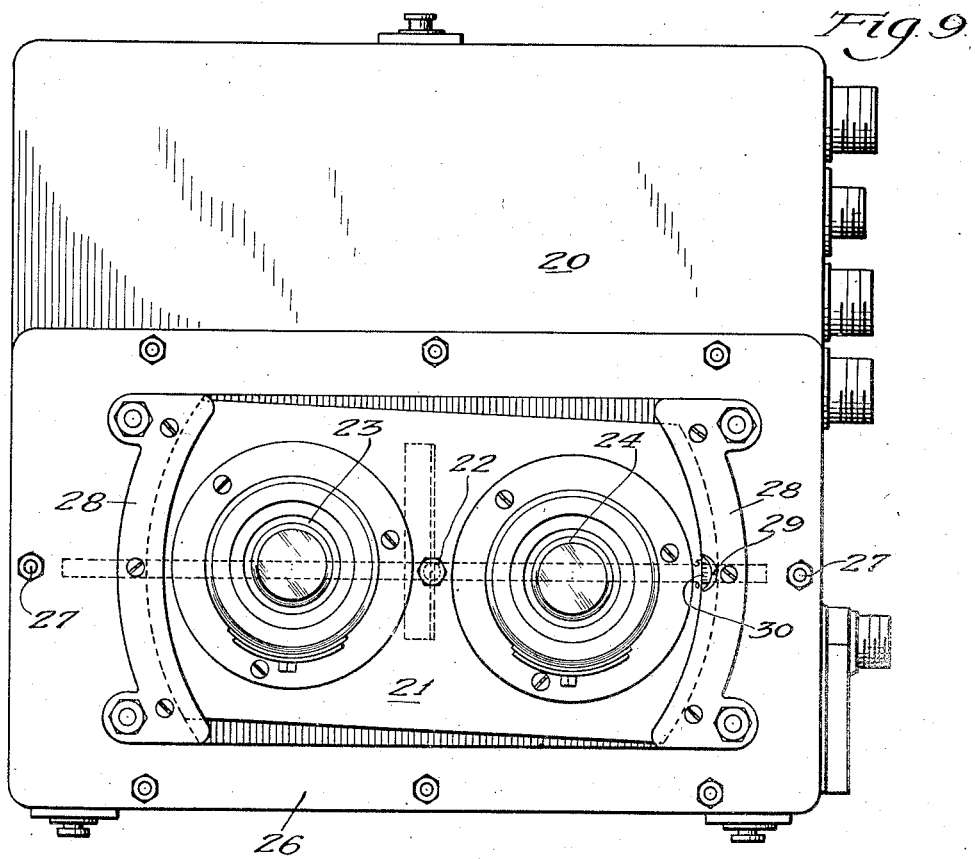
Figure 9 is a bottom plan view of the camera.

In carrying the invention into practice, use is preferably, but not necessarily made of the film moving mechanism described and shown in the copending application of myself and Victor Sussin, Ser. No. 498,754, filed August 16, 1943, now Patent Number 2,409,597 of October 15, 1946. The invention disclosed in said application enables presetting a film feeding mechanism for movement of the film across an exposure aperture and through the focal field of a photographic lens at any selected constant velocity, such that when the ground speed of an airplane is known, the film speed will be proportional thereto throughout the entire time a photograph is being made.

Referring to Figures 2, 3 and 4 of the accompanying drawings, it shall be assumed that the direction of flight of the aircraft A is as indicated by the arrow a, the flight of the aircraft being along a straight horizontal line. The aperture 10 of the camera is horizontal and perpendicular to said line of flight. The two sensibly identical lenses 11 and 12 lie with their entrance pupils in the same horizontal plane and are displaced laterally; i. e. at right angles to the line of flight. A schematically illustrated septum 13 is perpendicular to the connecting line between the two entrance pupils and bisects said line so as to prevent light from the right (starboard) lens from reaching the left (portside) portion of film F and light from the left lens from reaching the right (starboard) portion of said film. Lens 11 is forward of the portside half of the aperture, whereas, lens 12 is rearward of the starboard half of said aperture. As will be pointed to hereinafter, the lenses 11 and 12 are carried by a common horizontally disposed turret which may be selectively turned about a vertical axis within a given range of degrees, the setting of said lenses by an adjustment of the turret being in accordance with various known values of ground speed and altitude of the aircraft at the time the photograph is being taken.

With the vertical axes of the two lenses 11 and 12 disposed as shown at Figures 3 and 4 and upon erecting a perpendicular AD from the vertex between the two oblique rays AB and AC, to the opposite side BC, the rays AB and AC make equal angles with said perpendicular, ray AB directed forward and ray AC backward. In this manner the field of view V of lens 11 is directed forward and the field of view V of lens 12 backward, so that at any instant the two lenses are photographing different portions of the ground scene, lens 11 receiving the advancing terrain and lens 12 the receding terrain. Thus, in the course of time, the same terrain will be photographed by both lenses, but in different angular projection. Perpendicular AD intersects the longitudinal centerline of the exposure aperture of the camera. As the lenses 11 and 12 are equidistant laterally relative to the midpoint of said exposure aperture, the two photographs made by said lenses will be disposed longitudinally on the film and will be separated from each other by an imaginary septum or longitudinal center line of the film. The photographs made by each lens will consist of contiguous portions of the terrain. The resulting continuous photographs at the opposite sides of the longitudinal center line of the film will be substantially the same except that one will be taken at a different angular projection than the other. The infinite number of narrow strips or portions of the terrain photographed on the film at one side of the longitudinal centerline thereof will thereby be stepped longitudinally relative to the same narrow strips or portions photographed on the film at a slightly different time and in a different angular projection and disposed at the other side of said longitudinal centerline, thereby providing stereoscopic pairs of images of strips or portions of said terrain. The distance in a longitudinal direction which separates the images of each pair of images is of course determined by the fore and aft displacement of the lenses 11 and 12, it being remembered that the film speed is proportional to said ground speed.

Having given a general description of the functional characterizing features of the optical system herein employed, I shall now describe the forms, arrangements and relationships of the various mechanisms comprising my improved camera.

The camera comprises a case or enclosure 20 adapted to be mounted in the fuselage of the aircraft A and provided at its bottom with a horizontally disposed lens mounting or turret 21, pivoted at 22 to turn about a vertical axis and provided with a pair of downwardly projecting photographic objectives 23 and 24, such that there is one such objective at each side of the vertical axis 22. It also is observed that the vertical axes of said objectives are equidistantly related to said axis 22.

Said turret is in the form of a flat plate, the ends of which are received in arcuate guides 25 formed on a frame 26, the latter secured by bolts 27 to the lower edges of said case 20, and having a septum 13 which projects vertically into the case and is disposed between the objectives 23 and 24. Clamp members 28 on the frame 26 function to secure the turret in any selected position of angular adjustment about said axis 22. One of said clamp members is formed with a pointer 29 which coacts with markings 30 on the turret, which markings are calibrated to correspond to various values of ground speed and altitude. In this manner, the turret can be adjusted within a given range of degrees and will give a visual indication of the relation of the vertical axes of the two lenses to the exposure aperture of the camera.

The aforementioned aperture 10 is formed by two flat, rectangular plates 31—31 which lie in the same horizontal plane and are adapted to be adjusted as desired to thereby vary the width of the aperture. It will be sufficient to say that the plates 31—31 may be of the kind shown and described in said copending application of myself and Victor Sussin. In said application, the plates are adapted to be moved in unison by a suitable control mechanism. In the instant case, and assuming the aperture to be closed, the inner or confronting straight edges of said plates coincide with perpendicular A—D, Figures 3 and 4, and are at right angles thereto. It follows from this that said confronting edges of the plates are always parallel to each other, no matter what may be the transverse dimensions of the aperture formed by said plates and that said edges are always equidistantly related to said longitudinal center line.

Situated above the exposure aperture with its axis parallel thereto is a driven exposure drum 32 which operates off of a gear train 33 operated by a variable speed electric motor 34.

Said drum forms one element of a reeling and unreeling mechanism, the same including a driven take-up spool 35 and an idle pay-off spool 36. When the transmission is operating at a predetermined speed, the film F is continuously pulled across the exposure aperture and through the focal fields of the two lenses.

The camera herein described is especially designed for taking aerial photographs at given altitudes and speeds of the aircraft from which the photographs are to be taken.

Assuming that the camera employs lenses whose focal length are each thereof 88 mm., then the camera setting shall be in accordance with the theoretical values, as follows:

| Altitude, feet | Speed in M. P. H. | | | | | |
|---|---|---|---|---|---|---|
| | 200 | 225 | 250 | 300 | 350 | 400 |
| 100 | 10.2 | 11.4 | 12.7 | 15.2 | 17.8 | 20.3 |
| 150 | 6.8 | 7.6 | 8.5 | 10.2 | 11.9 | 13.6 |
| 200 | 5.1 | 5.7 | 6.3 | 7.6 | 8.9 | 10.2 |
| 250 | 4.1 | 4.6 | 5.1 | 6.1 | 7.1 | 8.1 |
| 300 | 3.4 | 3.8 | 4.2 | 5.1 | 5.9 | 6.8 |
| 400 | 2.5 | 2.9 | 3.2 | 3.8 | 4.4 | 5.1 |
| 500 | 2.0 | 2.3 | 2.5 | 3.0 | 3.5 | 4.1 |
| 600 | 1.7 | 1.9 | 2.1 | 2.5 | 3.0 | 3.4 |
| 700 | 1.4 | 1.6 | 1.8 | 2.2 | 2.5 | 2.9 |
| 800 | 1.3 | 1.4 | 1.6 | 1.9 | 2.2 | 2.5 |
| 900 | 1.1 | 1.3 | 1.4 | 1.7 | 2.0 | 2.3 |
| | Inches of Film Per Second | | | | | |

Before the aircraft is launched from the ground, the intended altitude and speed thereof at the time a photograph is to be taken shall be made known to the cameraman, who then sets the variable speed motor for subsequent operation of the film F at a speed proportional to the ground speed of the aircraft at the time the photograph is to be taken. For example, when lenses whose focal length are 88 mm. are employed and the altitude of the aircraft is 100 feet and the speed 200 miles per hour, then the film speed shall be 10.2 inches per second. Similarly, and according to the above theoretical values, the speed of the film driving means shall always be such that the velocity of the film across the exposure aperture will be proportional to whatever is the ground speed at the time a photograph is made from aircraft flying at a given altitude.

Not only are two continuous photographs made simultaneously on a single surface, but, and in addition thereto, every part of the film is utilized from the beginning of a continuous exposure to the instant such exposure shall have ceased, such that the resulting photograph will be characterized by an unbroken succession of stereoscopic pairs of images.

While I have shown and described a single film, it is to be understood that this shall not preclude use of two separate films operating in synchronism. I prefer using a single film as it can be more readily moved through a continuous viewer without possibility of disorganizing the stereoscopic relation of the images.

To the best of my knowledge, it is broadly new in the art of stereo photography, continuously to move a light sensitive surface through the focal fields of a pair of coactive lenses, the entrance pupils of which lie in the same horizontal plane and have parallel axes which are perpendicular to the plane of said surface, and disposed relative to the exposure aperture, so that, for each lens, there is a ray which lies in a vertical plane parallel to the line of flight, said ray passing through the center of the entrance pupil and intersecting the lateral center line of said aperture, and, hence, that portion of said surface which receives light from said lens. As previously stated, these rays determine the field centers for the respective lenses at any instant, the rays thus defined making equal angles with the vertical, the one ray directed forward, and the other backward. In view of this new principle of stereo photography, the nomenclature employed herein shall not be construed as limiting the invention to use for the making of aerial photographs. Phrases such as "line of flight," "direction of flight" and words and expressions employed herein to set forth the relationships and disposition of elements, such, for instance, that the exposure aperture is "horizontal and perpendicular to the line of flight," shall, therefore, be construed to mean that in any instance where there is relative motion between the camera and the scene, subject, area, or object desired to be photographed, the axes of the lenses shall always be perpendicular thereto. Also, in said instances, the speed of the image-receiving surface shall be coincident with the image movement.

The camera can be made in various sizes that will accommodate films of given width, and the septum disposed so as to be coincident with the longitudinal center line of the film, thereby furnishing a line of separation between equal longitudinal divisions of the film. The lenses will always be mounted so that the axes about which they are adapted to turn as a unit will also be coincident with the longitudinal center line of said film.

Figure 10:
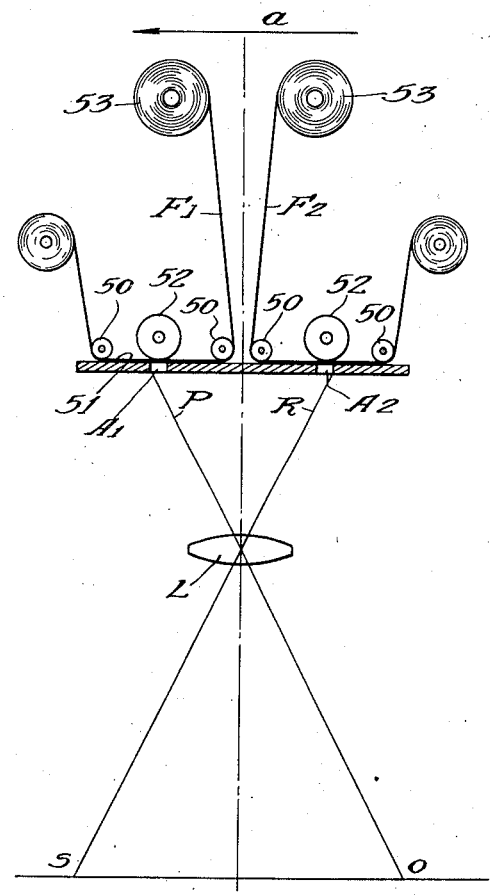
Figure 10 is a diagrammatic view of a modified embodiment of my invention.
Figure 11:
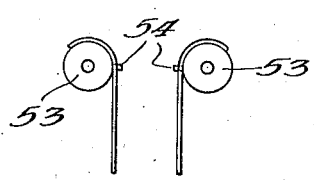
Figure 11 is a diagrammatic view of the pay-on spools.
Figure 12:
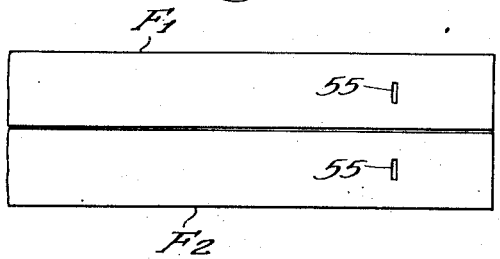
Figure 12 is a plan view of a portion of the films employed in the modified embodiment of my invention.

In the form of my invention shown at Figures 10, 11, and 12, I employ a single lens L, a pair of exposure apertures A1 and A2 and two separate films F1 and F2.

The apertures A1 and A2 lie in the same horizontal plane. The lens L also lies in a horizontal plane and is related to the apertures to define rays R—S and P—O, ray RS projecting obliquely in a rearward direction and ray P—S projecting obliquely in a forward direction, the direction of flight being as indicated by the arrow. Thus, the field for aperture A1 is ray P—O and the field for aperture A2 is ray R—S.

The films will be driven in absolute synchronism by respective transmission mechanisms of any well known type, it being desirable to provide for each mechanism a pair of guide rolls 50—50 disposed relative to a respective aperture to form a short horizontal stretch of film as indicated at 51. In coaction with each individual aperture is a pressure roll 52 for maintaining close contact of the film with said aperture.

The pay-on spools 53 of the transmission mechanisms are provided with radial pins 54 which are adapted to pass into slots 55 at the starting ends of the respective films. After the films have been threaded under rolls 50—50 and 52, spools 53—53 are turned to positions to bring their pins in absolute alignment with each other. The pins are then passed into the slots in the respective films and the film ends secured to the spools by adhesive tape, not shown.

By this method of attaching the respective films to the aforementioned spools 53—53, it is appreciated that when the resulting photographs are to be projected or viewed, the slots 55—55 may be brought into alignment with each other to determine the proper relationship to each other of the right and left pictures on the respective films. Any suitable well known mechanism can be employed for moving the films in synchronism through a viewer or projector, it simply being necessary that provision be made in the film feeding mechanism thereof to utilize the slots at the starting ends of the film to determine and maintain necessary stereoscopic relation of the pictures on the respective films.

I have disclosed alternative forms of my invention in order that it will appear manifest that my improved method of stereo photography can be practised in different ways, the main functional results of the two embodiments being the same. When separate films are employed as proposed in the modified embodiment of my invention, the transmission mechanisms for moving the films in synchronism will be so related to each other that the two films will bear a relation to each other that will be comparable to the relation to each other of the equal longitudinal divisions of the single film employed in the preferred embodiment of my invention.

Figure 13:
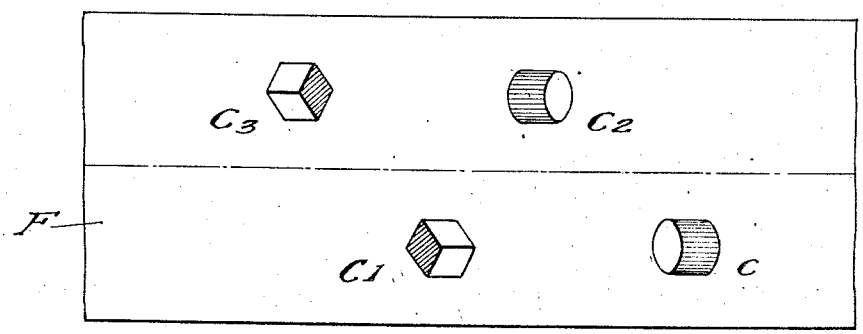
Figure 13 is a view in plan on a greatly exaggerated scale of the resulting photograph.

In Figure 13, there is shown a somewhat exaggerated view of a section of a film, the direction of flight being as indicated by the arrow $a$. The figure portrays the arrangement of images cast in different angular projection. Geometrical figures $c$, $c_1$, $c_2$, and $c_3$ are employed for the purpose of illustration and to avoid confusion. Images $c$ and $c_1$ are cast on one of the two equal longitudinal divisions of the film. Images $c_2$ and $c_3$ which are stereoscopically complementary to images $c$ and $c_1$ are cast on the other equal longitudinal division of said film. Separation longitudinally and laterally of $c$ relative to $c_2$, and similarly, longitudinal and lateral separation of image $c_1$ relative to image $c_3$ is due to the slight difference in time between the taking of two pictures of the same object, to which there is, of course, added the predetermined displacement of the lenses in the preferred embodiment of my invention. The same result is had when practicing the modified embodiment of my invention wherein but a single lens is employed. In either case, stereoscopic pairs of images are cast upon surfaces, each individual pair of complementary images giving the effect of depth or relief when the resulting photograph is viewed as aforementioned.

From the foregoing, it is apparent that the essence of the invention is the provision of means in an apparatus or the step or steps in the method of taking pictures, whereby, and as distinguished from the mere production of continuous panoramic pictures in which the images are in flat plan, two panoramic views are simultaneously produced in which the images are coordinated and so arranged as to give the effect of depth or relief.

Such terms as "laterally contiguous," "longitudinally contiguous," "laterally conjoined" and "longitudinally conjoined," wherever used in this description shall be taken to mean—the relationship to each other of images on a surface or surfaces in which there is no break in the continuity in any direction.

The term "perpendicular" used herein with respect to the principal axis of the lens or lenses employed, shall be construed to mean, at right angles to the single plane of the film at the point of effective exposure thereof, and not necessarily vertical relative to the horizontal line of flight as would be the case in those instances in which pictures are being taken from aircraft.

What I claim as my invention is:

1. In aerial stereo-photography, a camera having a shutterless horizontally disposed exposure slit which extends at right angles to the line of flight of an aircraft, means for continuously moving a strip of photographic material across said slit at a velocity which is the same at any instant as the speed of the image of the ground; two sensibly identical lenses situated below the plane of said slit and disposed with their entrance pupils in the same horizontal plane and at right angles to the line of flight of said aircraft and with their axes vertical and parallel to each other; a septum perpendicular to a connecting line between said entrance pupils and bisecting said connecting line and arranged substantially in vertical alignment with the longitudinal center of said strip of photographic material; and mounting means for and by which one of said lenses may be disposed forward of the port side half and the other rearward of the starboard half of said slit; the aforementioned arrangement of said lenses and relationship thereof to said slit being such that when the lenses are disposed as last stated, the relative angles of projection of said lenses are such that two pictures of the same ground object are recorded and arranged in stereoscopic relation on said strip of photographic material.

2. An aerial camera having a downwardly directed, horizontally disposed slit aperture; a pair of photographic lenses mounted beneath said aperture for rotational adjustment about a vertical axis disposed approximately at the transverse center of said aperture for setting the angles of projection of said lenses, said lenses having their axes disposed in a vertical plane and in parallel relation to each other and with their entrance pupils in the same horizontal plane; and means for moving a strip of photographic material transversely of said aperture and at a speed the same as that of the ground image, the aforementioned lenses adapted upon selected rotational adjustment thereof to establish a fore and aft relationship thereof to said aperture, so that one lens views ground objects from one side following which the other lens views the same objects from the other side thereof, thereby causing displacement of said images longitudinally of and recordation thereof on said strip as stereoscopic pairs of images of said objects.

3. An aerial camera adapted to be mounted on an aircraft, said camera having a downwardly directed slit aperture adapted to be disposed in a plane perpendicular to the line of flight of said aircraft; a pair of photographic objectives of given focal length; and a variable speed motor for moving a strip of photographic material transversely of said aperture and through the focal fields of said objectives; means mounting said objectives for selective rotational adjustment as a unit about a vertical axis disposed approximately at the mid-point between the ends of said aperture, said objectives having their axes perpendicular to said aperture and being laterally equidistantly related to said vertical axis so that upon selected rotational adjustment of said objectives the vertical axes thereof occupy predetermined fore and aft positions relative to the long axis of said aperture, whereby the angles of projection of said objectives are such that images of the same ground object are recorded at slightly different times and displaced on said strip to provide a stereoscopic pair of images of said object.

4. In aerial photography, a camera adapted to be mounted on an aircraft, said camera comprising a structure having a slit aperture adapted to be disposed in a plane perpendicular to the line of flight of said aircraft; two sensibly identical, downwardly projecting lenses of given focal length located beneath said aperture; means supporting a strip of photographic material in a horizontal position and for moving same transversely of said aperture and through the focal fields of said lenses and at a speed the same as that of the ground image; and means enabling selective setting of the angles of projection of said lenses and comprising a mounting supporting said lenses for rotational adjustment about a vertical axis located at the mid-point between the ends of said aperture to dispose said lenses with their entrance pupils in the same horizontal plane and their axes perpendicular to said strip and parallel to each other so that said lenses are adapted to be adjusted as a unit and their angles of projection disposed to record images of ground objects on said strip at slightly different times and displace said images on said strip to form stereoscopic pairs of images of said ground objects.

5. An aerial camera having means for supporting a strip of photographic material in a horizontal plane; said camera having a horizontally disposed slit-aperture underlying said strip and disposed parallel thereto and at right angles to the center line thereof; downwardly projecting photographic lenses mounted on said camera beneath said strip and respectively disposed on opposite sides of said center line and fore and aft of said aperture; a mounting supporting said lenses for rotational adjustment about a vertical axis situated approximately at the mid-point of said aperture and with their axes parallel to each other and perpendicular to said strip; and means for moving said strip transversely of said slit at a speed the same as that of the ground image.

FREDERICK THEODORE SONNE.

REFERENCES CITED

The following references are of record in the file of this patent:

UNITED STATES PATENTS

| Number | Name | Date |
| --- | --- | --- |
| 586,097 | Jeffery | July 13, 1897 |
| 728,584 | Dickson | May 19, 1903 |
| 755,235 | O'Donnell et al. | Mar. 22, 1904 |
| 899,862 | Crocker et al. | Sept. 29, 1908 |
| 1,169,163 | Kellner | Jan. 25, 1916 |
| 1,233,176 | Brewster | July 10, 1917 |
| 1,447,173 | Elms | Mar. 6, 1923 |
| 1,851,317 | Lihotzky | Mar. 29, 1932 |
| 1,874,615 | Pilny | Aug. 30, 1932 |
| 1,894,265 | Chretien | Jan. 17, 1933 |
| 1,909,222 | Pettie | May 16, 1933 |
| 1,939,172 | Jenkins | Dec. 12, 1933 |
| 2,168,273 | Sauer et al. | Aug. 1, 1939 |
| 2,240,728 | Vierling et al. | May 6, 1941 |
| 2,307,646 | Sonne | Jan. 5, 1943 |

FOREIGN PATENTS

| Number | Country | Date |
| --- | --- | --- |
| 519,779 | Germany | Mar. 4, 1931 |
| 564,796 | France | Jan. 10, 1924 |
| 840,955 | France | May 8, 1939 |

OTHER REFERENCES

"The Multiplex Aero-Projector," pamphlet by Zeiss Co., of Jena. Received in Division 7, October 3, 1940.